US006920038B2

(12) United States Patent
Gehlbach

(10) Patent No.: US 6,920,038 B2
(45) Date of Patent: Jul. 19, 2005

(54) TERMINAL BLOCK AND RENOVATION LOAD CENTER EMPLOYING THE SAME

(75) Inventor: James L. Gehlbach, Lincoln, IL (US)

(73) Assignee: Eaton Corporation, Cleveland, OH (US)

( * ) Notice: Subject to any disclaimer, the term of this patent is extended or adjusted under 35 U.S.C. 154(b) by 209 days.

(21) Appl. No.: 10/445,505

(22) Filed: May 27, 2003

(65) Prior Publication Data

US 2004/0240159 A1 Dec. 2, 2004

(51) Int. Cl.$^7$ ................................................ H02B 1/04
(52) U.S. Cl. ....................... 361/648; 361/652; 361/822; 361/826; 439/709
(58) Field of Search ............................ 174/70 B, 71 B, 174/72 B, 88 B, 149 B; 361/622, 626, 627, 634, 641, 645, 644, 648, 652, 668, 669, 673, 822–824, 826–827; 439/709, 716, 797, 517–518

(56) References Cited

U.S. PATENT DOCUMENTS

| | | | | |
|---|---|---|---|---|
| 1,886,743 A | * | 11/1932 | Roth | 361/631 |
| 2,397,102 A | * | 3/1946 | Graham | 439/717 |
| 2,786,190 A | * | 3/1957 | Stahl | 439/709 |
| 3,983,311 A | | 9/1976 | Brumfield et al. | |
| 4,667,269 A | | 5/1987 | Morby et al. | |
| 4,689,493 A | | 8/1987 | Nozick et al. | |
| 4,783,718 A | * | 11/1988 | Raabe et al. | 361/652 |
| 5,053,919 A | * | 10/1991 | Schacht | 361/652 |
| 5,340,945 A | | 8/1994 | Gehrs et al. | |
| 5,745,337 A | | 4/1998 | Reiner | |
| 5,870,276 A | * | 2/1999 | Leach et al. | 361/627 |
| 5,905,630 A | | 5/1999 | Wetterling | |
| 6,186,838 B1 | * | 2/2001 | Foster | 439/797 |
| 6,262,880 B1 | * | 7/2001 | Fischer et al. | 361/652 |
| 6,365,990 B2 | | 4/2002 | Flegel | |
| 6,570,754 B2 | * | 5/2003 | Foley et al. | 361/648 |

* cited by examiner

Primary Examiner—Gregory Thompson
(74) Attorney, Agent, or Firm—Martin J. Moran

(57) ABSTRACT

A renovation load center includes an enclosure, a branch circuit assembly mounted in the enclosure, and two renovation terminal blocks having a side and a plurality of first terminations electrically connected to at least some of the incoming lines and the branch conductors of a distribution system. Each renovation terminal block includes a plurality of second terminations. Each of the first terminations is electrically connected to a corresponding one of the second terminations. Each pair of one of the first terminations and the corresponding one of the second terminations is disposed on the same side of the renovation terminal block and is electrically isolated from at least one adjacent pair of another one of the first terminations and a corresponding one of the second terminations. A plurality of cables are electrically connected between the second terminations and the branch circuit assembly.

23 Claims, 8 Drawing Sheets

TERMINAL BLOCK AND RENOVATION LOAD CENTER EMPLOYING THE SAME

BACKGROUND OF THE INVENTION

1. Field of the Invention

This invention relates to terminations for wiring and, more particularly, to a terminal block for a renovation load center. The invention also relates to renovation load centers employing terminations for wiring, such as terminal blocks.

2. Background Information

Load centers house the connections between the incoming lines of an electric power distribution system and the numerous branch circuits in an installation, such as a residence or light commercial or industrial facility. Overcurrent protection is provided for the branch circuits in older load centers by fuses, but now in most newer installations by circuit breakers. Additional protection, such as surge protection, is provided in some load centers. Typically, the load center will have a main circuit breaker as well as separate breakers for each of the branch circuits.

The load center includes an enclosure, which may be fabricated from sheet metal or molded of an insulative resin. Housed in the enclosure is a branch circuit assembly, also commonly referred to as the interior, which typically includes a pair of line buses secured by a support insulator to the rear wall of the enclosure. The fuses or circuit breakers connect each branch hot conductor to one of the line buses, or to both buses in the case of a two pole breaker. The branch circuit assembly also includes one or more neutral terminal blocks to which the branch circuit neutral conductors are secured. In some cases, such as for ground fault circuit breakers, a ground terminal block or blocks are also provided in the enclosure.

There comes a time when the existing load center needs to be replaced, such as where a fuse load center is replaced by a load center with circuit breakers, or for instance, where branch circuits are added or updated. Typically, in existing load centers, the incoming lines are made as short as possible. It is common for them to be too short to reach the required terminals in the replacement load center. However, the gauge of the incoming lines is large enough that it is difficult, time consuming and expensive to splice extensions onto the incoming lines. It is known to provide a renovation load center including an enclosure in which a branch circuit assembly is mounted and also including one or more renovation terminal blocks having two sides. A first side of these terminal blocks accepts incoming existing wiring (e.g., from an electrical receptacle; from an electric utility). An opposite second side of such terminal blocks accepts wiring going to the desired connection point (e.g., the load terminal of a branch circuit breaker; the line terminals of a main two-pole circuit breaker) inside the renovation load center. The enclosure may include an auxiliary enclosure in which the renovation terminal blocks are mounted. The auxiliary enclosure may be mounted on a main load center enclosure.

In such a renovation load center, it may be inconvenient to gain access to the first side of the renovation terminal blocks, which accept the incoming existing wiring, when the first side is positioned relatively close to the top or end of the main load center enclosure or the auxiliary enclosure.

There is a need, therefore, for an improved terminal block, which provides improved access to its terminals.

There is also a need for an improved load center, which provides improved access to terminal block terminals.

SUMMARY OF THE INVENTION

These needs and others are satisfied by the invention which is directed to a renovation load center for a distribution system having incoming lines and a plurality of branch conductors, such as, for example, a hot conductor and a neutral conductor. A renovation terminal block allows for wiring of such load centers in a replacement situation where the existing wiring is too short to reach the desired connection point. This terminal block allows the splicing of wires inside an enclosed load center. An existing wire is landed at a first terminal of a dual terminal of the terminal block and a new section of wire continues from a second terminal of the dual terminal to the desired connection point. For example, the existing wire may be electrically connected between the first terminal and an electrical receptacle or other electrical device. Then, since that existing wire is too short, the new section of wire may continue from the second terminal, which is electrically connected to the first terminal, to the desired connection point at the load side of a circuit breaker. In accordance with the invention, the first and second terminals are accessed from the same side of the terminal block.

As one aspect of the invention, a renovation load center is for a distribution system having incoming lines and a plurality of branch conductors. The renovation load center comprises: an enclosure; a branch circuit assembly mounted in the enclosure; at least one renovation terminal block including a side and a plurality of first terminations electrically connected to at least some of the incoming lines and the branch conductors, the renovation terminal block also including a plurality of second terminations, with each of the first terminations being electrically connected to a corresponding one of the second terminations, each pair of one of the first terminations and the corresponding one of the second terminations being disposed on the same side of the renovation terminal block and being electrically isolated from at least one adjacent pair of another one of the first terminations and a corresponding one of the second terminations; and a plurality of cables electrically connected between the second terminations and the branch circuit assembly.

The enclosure may include a top and a side. The renovation terminal block may be mounted proximate the side of the enclosure. The incoming lines and the branch conductors may include a first portion, which enters the enclosure from the top thereof, and a second portion, which is routed at about a right angle with respect to the first portion to one of the first terminations of the side of the renovation terminal block. The cables may include a first portion, which exits from one of the second terminations of the side of the renovation terminal block, and which is routed in parallel with the second portion of a corresponding one of the incoming lines and the branch conductors. The cables may further include a second portion, which is electrically connected to the branch circuit assembly.

The housing may include a pair of end walls and a plurality of dividing walls, with each of the dividing walls being between (i) a pair of one of the first terminations and the corresponding one of the second terminations and (ii) an adjacent pair of another one of the first terminations and a corresponding one of the second terminations.

The housing may further include a back wall between the end walls and normal to the dividing walls and an internal wall parallel to the back wall. The back wall, the end walls, the dividing walls and the internal wall may define a plurality of compartments, with each of the compartments housing a corresponding pair of one of the first terminations and the corresponding one of the second terminations. Each pair of one of the first terminations and the corresponding one of the second terminations may include a terminal lug having a first opening adapted to receive one of the incoming lines and the branch conductors, a second opening adapted to receive one of the cables, a first fastener adapted to electrically and mechanically secure the one of the incoming lines and the branch conductors in the first opening, and a second fastener adapted to electrically and mechanically secure the one of the cables in the second opening.

As another aspect of the invention, a terminal block comprises: a housing including a side having a plurality of first terminations and a plurality of second terminations, each of the first terminations being electrically connected to a corresponding one of the second terminations, each pair of one of the first terminations and the corresponding one of the second terminations being disposed on the same side of the terminal block and being electrically isolated from at least one adjacent pair of another one of the first terminations and a corresponding one of the second terminations.

The housing may include a pair of end walls and a plurality of dividing walls, with each of the dividing walls being between (i) a pair of one of the first terminations and the corresponding one of the second terminations and (ii) an adjacent pair of another one of the first terminations and a corresponding one of the second terminations.

The housing may include a back wall between the end walls and normal to the dividing walls and an internal wall parallel to the back wall. The back wall, the end walls, the dividing walls and the internal wall may define a plurality of compartments, with each of the compartments housing a corresponding pair of one of the first terminations and the corresponding one of the second terminations.

Each pair of one of the first terminations and the corresponding one of the second terminations may include a terminal lug having a first opening adapted to receive a first conductor, a second opening adapted to receive a second conductor, a first fastener adapted to electrically and mechanically secure the first conductor in the first opening, and a second fastener adapted to electrically and mechanically secure the second conductor in the second opening.

Each of the compartments may include a lock tab, which engages and retains the terminal lug therein.

The internal wall may include a plurality of openings therein. Each of the openings of the internal wall may be associated with the first and second openings of a corresponding one of the terminal lugs.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
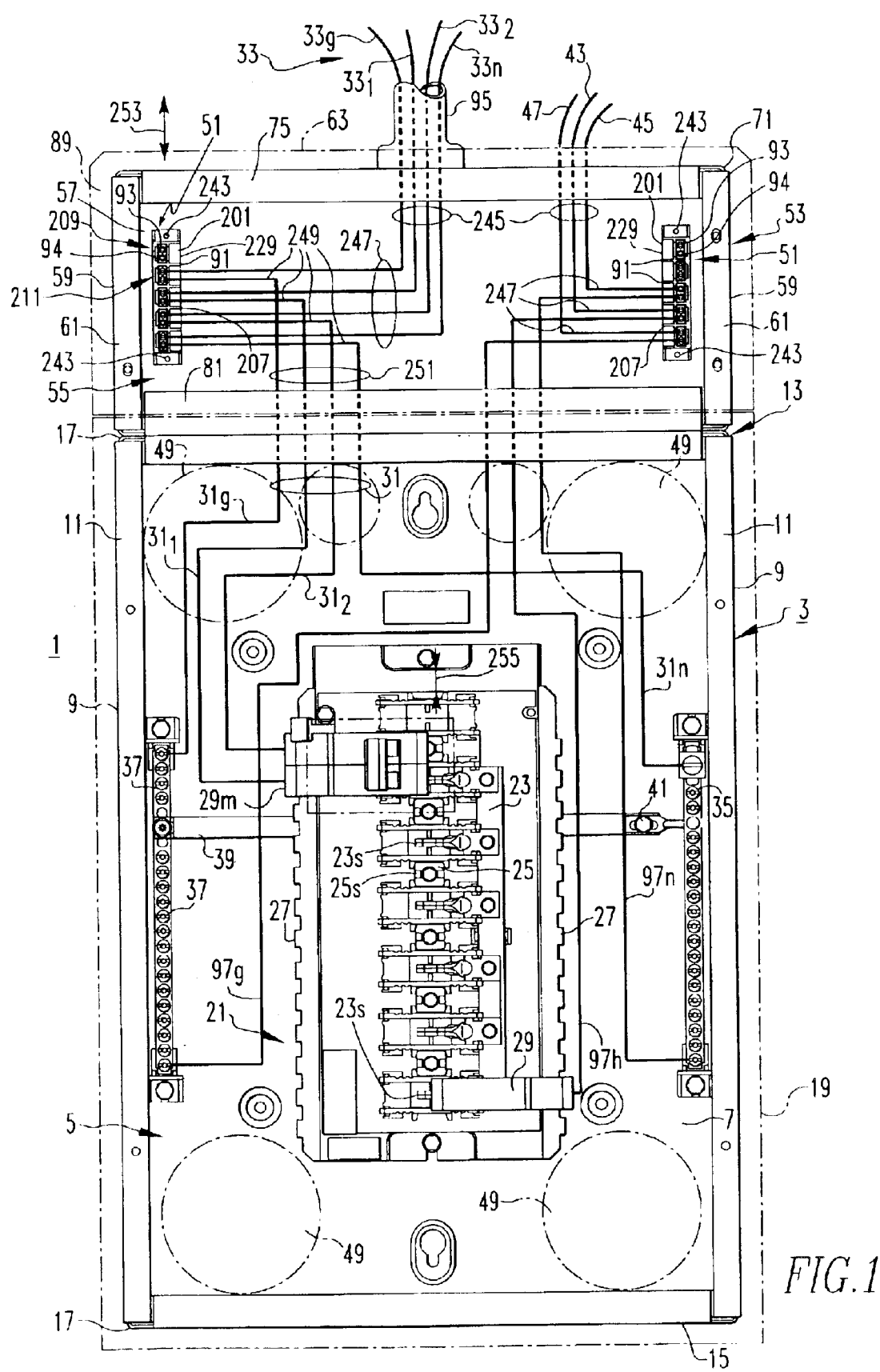
FIG. 1 is a front elevation view with the cover removed of a renovation load center in accordance with the first embodiment of the invention which includes a main enclosure and an auxiliary enclosure.
Figure 4:
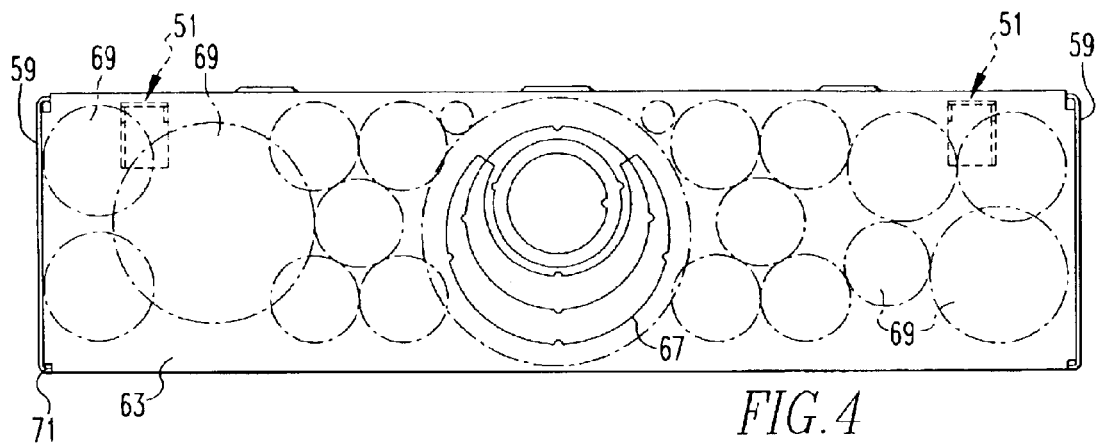
FIG. 4 is a top view of the auxiliary enclosure of FIG. 1.
Figure 2:
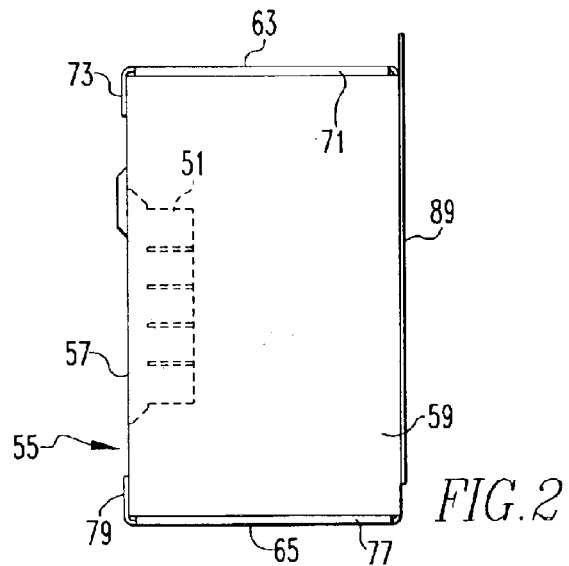
FIG. 2 is a side elevation view of the auxiliary enclosure which forms part of the renovation load center of FIG. 1.

As employed herein, the term "load center" encompasses a switchgear cabinet (e.g., without limitation, a panel board or other type of load center).

The renovation load center of the invention can be used as a replacement for an existing load center. Circumstances where the invention might be used include, but are not limited to, installations where an old fused load center is being replaced by a load center with circuit breakers, or an installation where an existing load center with circuit breakers is being upgraded with or without the provision for additional branch circuits. It is common for the incoming supply lines, and in some instances the branch circuit conductors also, to be too short to extend to the terminations in a replacement load center. Typically, the incoming supply lines are of such a gauge that it is difficult to splice extensions onto these lines. While the branch conductors are commonly not of such heavy gauge, it is still also inconvenient, time-consuming and costly to splice extensions on these conductors.

FIGS. 1–4 illustrate a first embodiment of a renovation load center in accordance with the invention that addresses these problems. The renovation load center 1 includes a main enclosure 3 fabricated from sheet metal. This main enclosure 3 includes a center section 5 forming a rear wall 7 with integral sidewalls 9 terminating in inwardly directed, forwardly facing side flanges 11. The main enclosure 3 further includes a sheet metal top wall 13 and bottom wall 15 which are both identical to the top wall 63 described in connection with the auxiliary enclosure 53 to be described. These top and bottom walls 13 and 15 have flanges 17 by which they are secured to the center section for instance by welding or a mechanical crimping process such as the TOX® lock process marketed by Tox Pressotechnik Gmbh, of Weingarten, Federal Republic of Germany. Finally, the main enclosure 3 includes a cover 19 which has been removed to show the interior of the main enclosure, but is shown in phantom line drawing. As is well known, the cover 19 typically includes a hinged door (not shown) for access to the interior.

The main enclosure 3 contains a branch circuit assembly 21 commonly referred to as the interior of the load center, which is secured to the rear wall 7 and includes two line buses 23 and 25 extending vertically and forming alternate, vertically aligned stabs 23s and 25s which can be engaged by line side conductors of circuit breakers, such as 29,29m. The branch circuit assembly 21 also includes notched, vertically extending circuit breaker mounting flanges 27. Such branch circuit assemblies or interiors 21 are well known and will not be further described in detail. Miniature circuit breakers 29 (only one circuit breaker 29 is shown) engage the mounting flange 27 on one side of the assembly and one of the stabs 23s or 25s. Two miniature circuit breakers 29 can be mounted in confronting relation to stabs of the same bus 23 or 25 and to opposite mounting flanges 27. In the arrangement shown, a two pole circuit breaker 29m engages adjacent stabs 23s and 25s. This breaker 29m is back fed through the cables $31_1$ and $31_2$ to energize the buses 23 and 25 and serves as a main circuit breaker for the load center.

Incoming lines or conductors 33 from a supply include lines $33_1$ and $33_2$, neutral lead 33n and, in some cases, ground lead 33g. The main enclosure 3 also includes a neutral terminal strip 35 and can contain a ground terminal strip 37. In the installation shown, the neutral terminal strip 35 is grounded at the load center by a strap 39 which is connected to both the neutral terminal strip 35 and the ground terminal strip 37 and is also connected to the metal enclosure at the rear wall 7 by the fastener 41. The circuit breaker 29 is electrically connected to a hot lead 43 which extends out of the auxiliary enclosure 53 to a branch circuit serving one or more loads (not shown). A corresponding neutral lead 45 from each of the branch circuits is returned to the neutral terminal strip 35. If required, a ground lead 47 can be provided from the ground terminal strip 37 for each branch circuit. The neutral terminal strip 35 and the ground terminal strip 37 are electrically connected to supply leads 33n and 33g, respectively. These connections will be explained in detail later.

As shown in FIG. 1, all of the input conductors and branch conductors penetrate the main enclosure 3 through the top wall 13. As mentioned, this top wall 13 is identical to the top wall 63 shown in FIG. 4. The appropriate knockouts are used for the particular installation. Thus, the installation shown is top fed. As is well known, in some installations the load center can be bottom fed. Thus, the appropriate knockouts in the bottom wall 15 are used for penetration of the conductors. Alternatively, the load center can be fed through the back at the top or bottom as shown by the various knockouts 49 in the rear wall 7.

As described to this point, the main enclosure 3 with its branch circuit assembly 21 and neutral and ground terminal strips 35 and 37 is identical to a type of load center currently provided for use in new installations. In such new installations, the incoming conductors 33, the hot leads 43, neutral leads 45 and ground leads 47 are all long enough to be connected directly to the branch circuit assembly 21, the circuit breaker 29, the neutral terminal strip 35 and the ground terminal strip 37. However, when such a load center is provided in a renovation application, these leads are often not long enough to reach their connections within the enclosure 3. Therefore, in accordance with the invention, one or more renovation terminal blocks 51 are provided at a point where they can be reached by the existing wiring including the incoming lines 33, the hot leads 43, neutral leads 45 and the ground leads 47. In the embodiment shown in FIG. 1, these terminal blocks 51 are provided in the auxiliary enclosure 53 which is mounted adjacent to the main enclosure 3. In the exemplary installation, the auxiliary enclosure 53 is mounted on top of the main enclosure 3. The terminal blocks 51 are discussed in greater detail, below, in connection with FIGS. 6–14.

As can be seen from FIGS. 1–4, the auxiliary enclosure 53 is similar in construction, but smaller than, the main enclosure 3. Thus, the auxiliary enclosure 53 has a sheet metal center section 55, forming a rear wall 57, pair of integral sidewalls 59 terminating in forward facing, inwardly directed side flanges 61. The auxiliary enclosure 53 has the top wall 63 shown in plain view in FIG. 4 and a bottom wall 65 shown in FIG. 3. The top wall 63 has a center knockout 67 for conduit carrying the incoming lines 33 of varying sizes, and a number of other knockouts 69, any one or more of which can be removed for accommodating the branch conductors 43, 45 and 47. As can be seen from FIGS. 1, 2 and 4, the top wall 63 has side flanges 71, which are secured to the side walls 59, and a rear flange 73, which is secured to a rear wall 57 of the center section 55. A front flange 75 extends between the side flanges 61.

Figure 3:
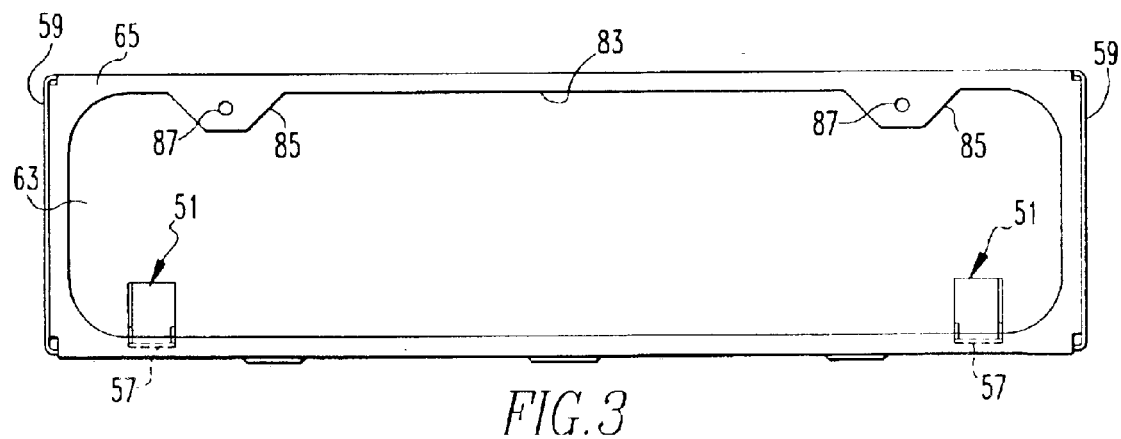
FIG. 3 is a bottom view of the auxiliary enclosure of FIG. 1.

The bottom wall 65 of the auxiliary enclosure 53, which is shown in bottom plan view in FIG. 3, has side flanges 77 (FIG. 2) which are secured to the side walls 59 of the center section 55 and a rear flange 79 (FIG. 2) which is secured to the rear wall 57. A front flange 81 (FIG. 1) extends upward along the front edge of the bottom wall 65 between the side flanges 61. The bottom wall 65, as shown in the bottom plan view of FIG. 3, has a large opening 83. A pair of tabs 85 extending into the opening 83 have apertures 87 through which fasteners (not shown) secure the auxiliary enclosure 53 to the top of main enclosure 3. In this manner, the auxiliary enclosure 53 can easily be added in the field as needed. The auxiliary enclosure 53 also has a cover 89 shown in place in FIG. 2 but shown removed in FIG. 1 but in phantom line drawing.

In the embodiment of FIGS. 1–4, the terminal blocks 51 are secured to the rear wall 57 of the auxiliary enclosure 53. The terminal blocks 51 are of a type having insulating barriers 91 between the individual first terminations 93, in order that conductors of differing potentials can be terminated adjacent one another without the danger of arcing. As the incoming lines 33 protected by a conduit 95 are not long enough to reach their terminations within the main enclosure 3, they are connected to the first terminations 93 on one of the terminal blocks 51. Cables $31_1$, and $31_2$ are connected to the corresponding second terminations 94 and then are fed through the opening 83 in the bottom wall 65 of the auxiliary enclosure 53, through a knockout (not shown) in the top wall of the main enclosure 3 and then to the appropriate termination on the main circuit breaker 29m. In addition, cables 31n and 31g extend from one of the terminal blocks 51 to the neutral terminal strip 35 and ground terminal strip 37, respectively. If any of the hot leads 43, neutral leads 45 or ground leads 47 are too short to reach the associated circuit breaker, termination on the neutral terminal strip 35 or termination on the ground terminal strip 37, respectively, then they can be connected to a corresponding first termination 93 on one of the terminal blocks 51 and a cable 97h, 97n or 97g can be connected between the corresponding second termination 94 and the appropriate termination in the main enclosure 3.

If the main enclosure 3 is bottom fed, then the auxiliary enclosure 53 can be mounted (not shown) to the bottom wall 15 of the main enclosure.

Figure 5:
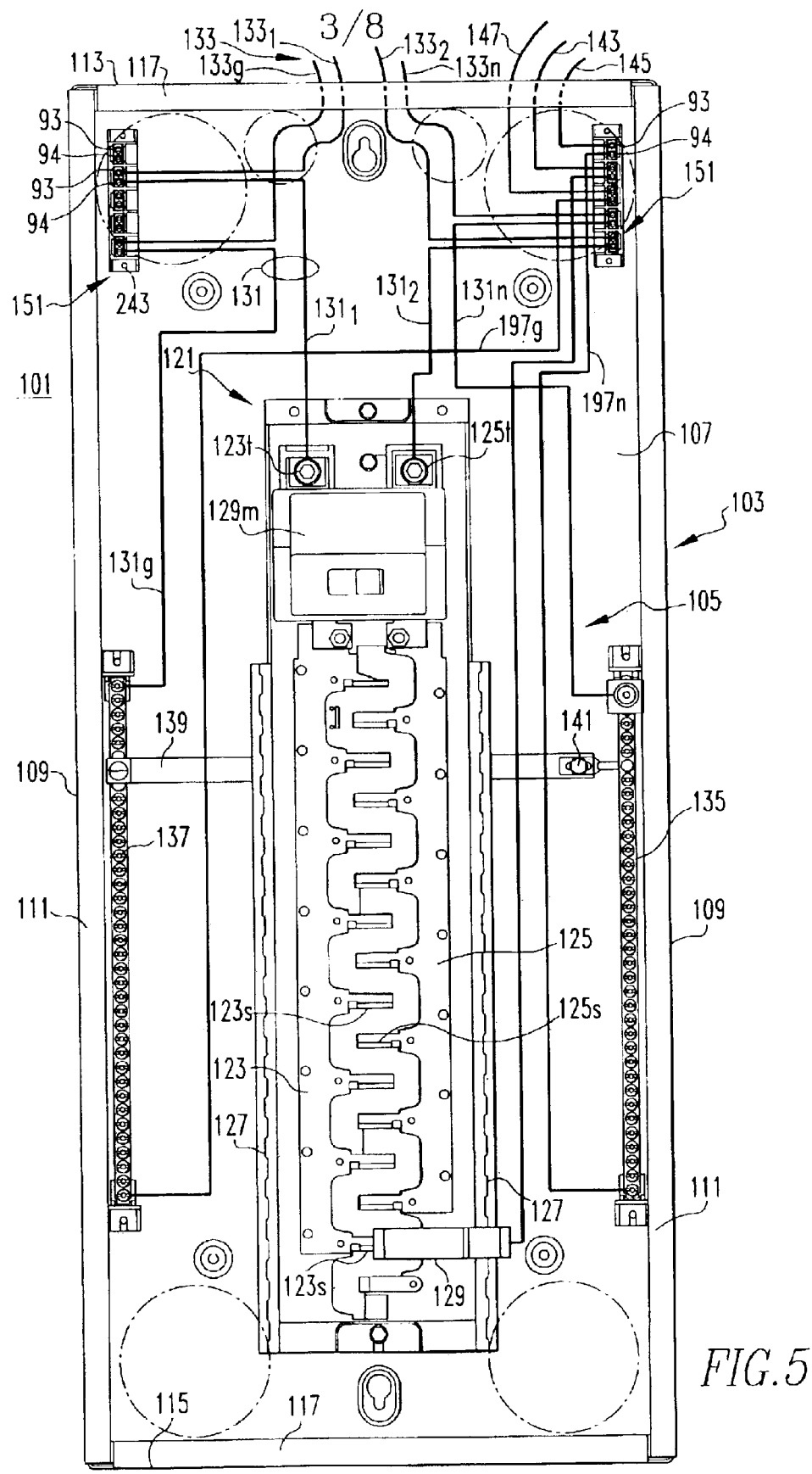
FIG. 5 is a front elevation view of another embodiment of the renovation load center with the cover removed in accordance with the invention.

FIG. 5 illustrates another embodiment of a renovation load center in accordance with the invention. This renovation load center 101 has a single enclosure 103 also fabricated from sheet metal. The center section 105 has a rear wall 107, side walls 109 and front facing side flanges 111. The enclosure 103 also has a top wall 113 and bottom wall 115 secured to the center section 105 in a manner similar to that described above in connection with the embodiment of FIGS. 1–4 and each having a front flange 117. A cover (not shown) is secured to the flanges 111 and 117 and has a hinged door (not shown) for access to the interior of the enclosure 103 as is well known.

A branch circuit assembly 121, also known as the interior, has a first line bus 123 with stabs 123s and a second line bus 125 with stabs 125s alternating with the other stabs 123s. Notched circuit breaker mounting flanges 127 extend vertically along each side of the branch circuit assembly 121. A two pole main circuit breaker 129m has one pole connected between the first line bus 123 and a first line bus terminal 123t. Similarly, the second pole of the main circuit breaker 129m is connected between the second line bus 125 and a second line bus terminal 125t. A plurality of miniature circuit breakers 129 (only one circuit breaker 129 is shown) engage half of one of the stabs 123s or 125s and one of the circuit breaker mounting flanges 127.

The main enclosure 103 also includes a neutral terminal strip 135 and ground terminal strip 137. The neutral terminal strip 135 is grounded at the load center by a strap 139 which is connected to both the neutral terminal strip 135 and the ground terminal strip 137 and is secured to the metal enclosure 103 at the rear wall 107 by the fastener 141.

The incoming lines 133 include lines $133_1$ and $133_2$, neutral 133n and in some cases ground 133g. For each branch circuit served by one of the circuit breakers 129 there is a hot lead 143, a neutral lead 145 and a ground lead 147. As any or all of these external conductors may not be long enough to extend to their connections within the enclosure 103, one or more renovation terminal blocks 151 are provided adjacent the point of penetration of the enclosure 103 by these external lines and parallel with the side walls 109. The terminal blocks 151 are the same as the terminal blocks 51 of FIG. 1.

In the embodiment of FIG. 5, where the incoming lines and the branch circuit lines are all fed through the top of the enclosure 103, the pair of renovation terminal blocks 151 are provided on the back wall 107 proximate the top wall 113 of the enclosure 103. A cable $131_1$ connects the incoming line $133_1$ through a second termination 94 on one of the renovation terminal blocks 151 to the terminal 123t for the first line bus 123 of the branch circuit assembly 121. Similarly, a cable $131_2$ connects the incoming line $133_2$ to the second line bus terminal 125t, while cable 131n connects the line 133n to the neutral terminal strip 135 and the lead 131g connects the ground conductor 133g to the ground terminal strip 137, all through second terminations 94 on one of the terminal blocks 151. Also, if the branch circuit conductors 143 or 145 or 147 are not long enough to reach the circuit breaker 129, or the appropriate terminal strips 135 or 137, then conductors 197h or 197n or 197g, respectively, can connect these branch circuit conductors to the appropriate terminations through a corresponding first termination 93 on one of the renovation terminal blocks 151.

Figure 11:
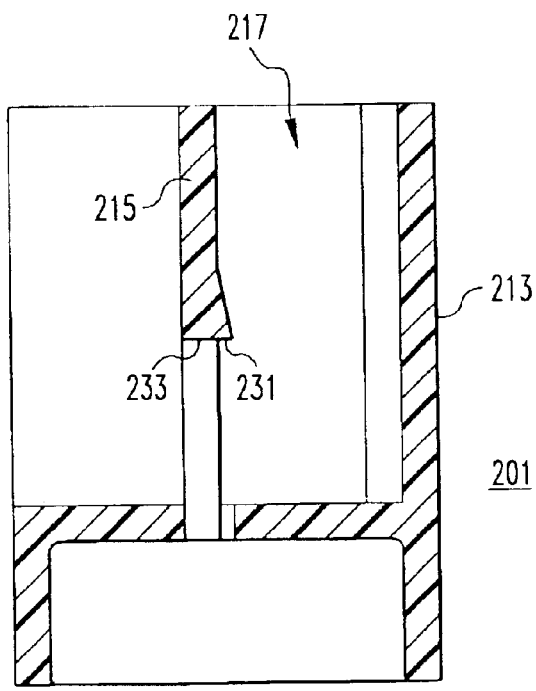
FIG. 11 is a sectional view along lines 11—11 of FIG. 8.
Figure 12:
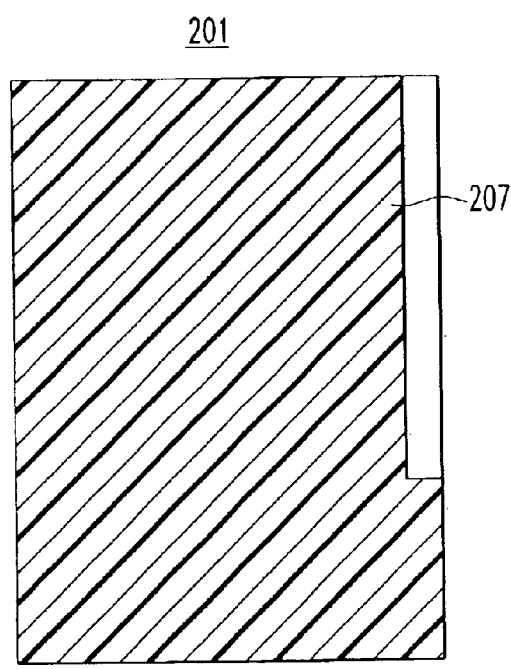
FIG. 12 is a sectional view along lines 12—12 of FIG. 8.
Figure 13:
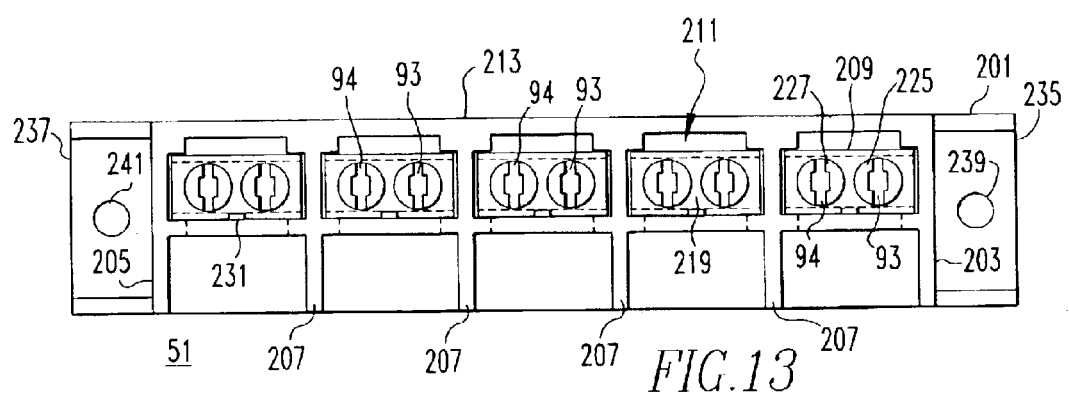
FIG. 13 is a plan view of the terminal block of FIG. 1.

Referring to FIGS. 6–12, the molded housing 201 of the terminal blocks 51 and 151 of respective FIGS. 1 and 5 is shown. The housing 201 includes a pair of end walls 203,205 and a plurality of dividing walls 207 (one of which is best shown in FIG. 12). As best shown in FIG. 13, each of the dividing walls 207 is between a pair, such as 209, of one of the first terminations 93 and the corresponding one of the second terminations 94, and an adjacent pair, such as 211, of another one of the first terminations 93 and a corresponding one of the second terminations 94.

Figure 14:
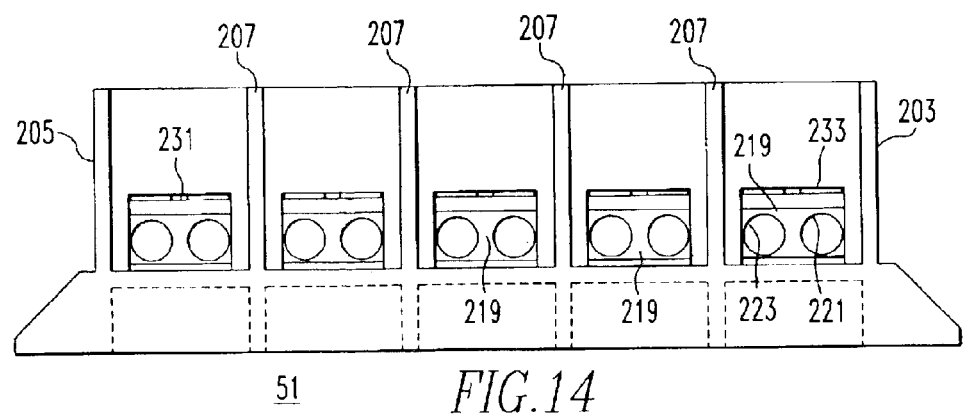
FIG. 14 is a front elevation view of the terminal block of FIG. 1.

The housing 201 further includes a back wall 213 between the end walls 203,205 and normal to the dividing walls 207 and an internal wall 215 parallel to the back wall 213. The back wall 213, the end walls 203,205, the dividing walls 207 and the internal wall 215 define a plurality of compartments 217. Each of the compartments 217 houses a corresponding pair, such as 209,211, of one of the first terminations 93 and the corresponding one of the second terminations 94. As shown in FIGS. 13 and 14, each of those pairs, such as 209,211, includes a terminal lug 219 having a first opening 221 adapted to receive a first conductor, such as 33g of FIG. 1, of one of the incoming lines 33,133 and the branch conductors 43,45,47,143,145,147, a second opening 223 adapted to receive a second conductor, such as 31g of FIG. 1 of one of the cables 31,131. The terminal lug 219 also includes a first fastener 225 adapted to electrically and mechanically secure the first conductor, such as 33g, in the first opening 221, and a second fastener 227 adapted to electrically and mechanically secure the second conductor, such as 31g, in the second opening 223. Preferably, the first and second fasteners 225,227 are compression screw terminals, and the terminal lug 219 is identical to two of the terminals of the neutral bar 35 of FIG. 1. In this manner, the terminal lug 219 electrically connects one of the first terminations 93 and the corresponding one of the second terminations 94 for each of the compartments 217 of the housing 201 of the terminal block 51.

As shown in FIG. 1, the two terminal blocks 51 are positioned parallel to and proximate the two integral opposite sidewalls 59 of the auxiliary enclosure 53. In accordance with the invention, the housing 201 of the terminal blocks 51 includes a common side 229, with each of the pairs, such as 209,211, including one of the first terminations 93 and the corresponding one of the second terminations 94, being disposed for access from the same terminal block side 229, and being electrically isolated by the dividing walls 207 from one or two adjacent pairs of another one of such first and second terminations 93,94. Each of the dividing walls 207 is between a pair, such as 209, of one of the first terminations 93 and the corresponding one of the second terminations 94, and an adjacent pair, such as 211, of another one of the first terminations 93 and a corresponding one of the second terminations 94.

As shown in FIGS. 8, 11, 13 and 14, each of the compartments 217 includes a lock tab 231, which engages and retains (as best shown in FIGS. 13 and 14) the corresponding terminal lug 219 therein.

Figure 6:
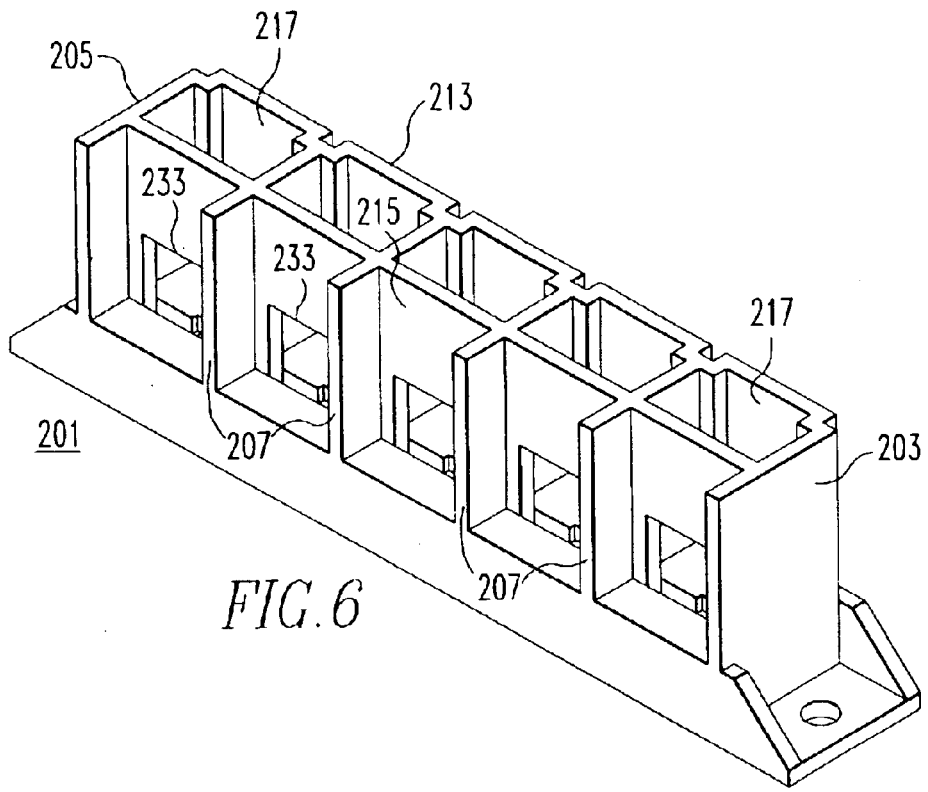
FIG. 6 is a front isometric view of the housing of the terminal block of FIG. 1.
Figure 7:
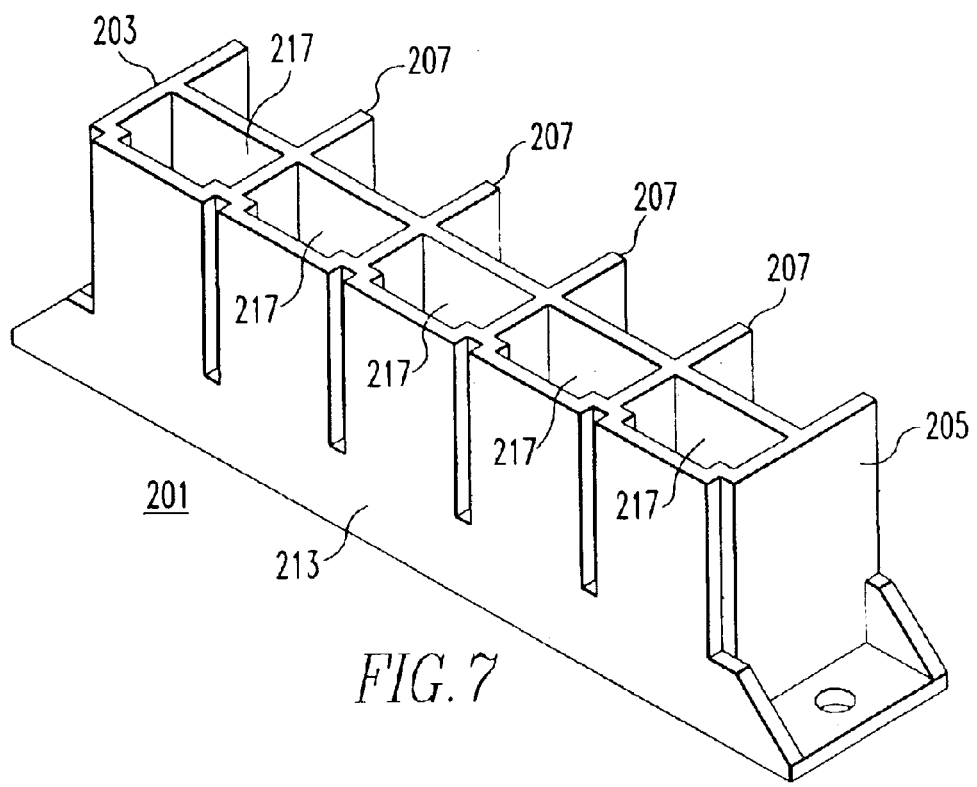
FIG. 7 is a rear isometric view of the housing of the terminal block of FIG. 1.
Figure 8:
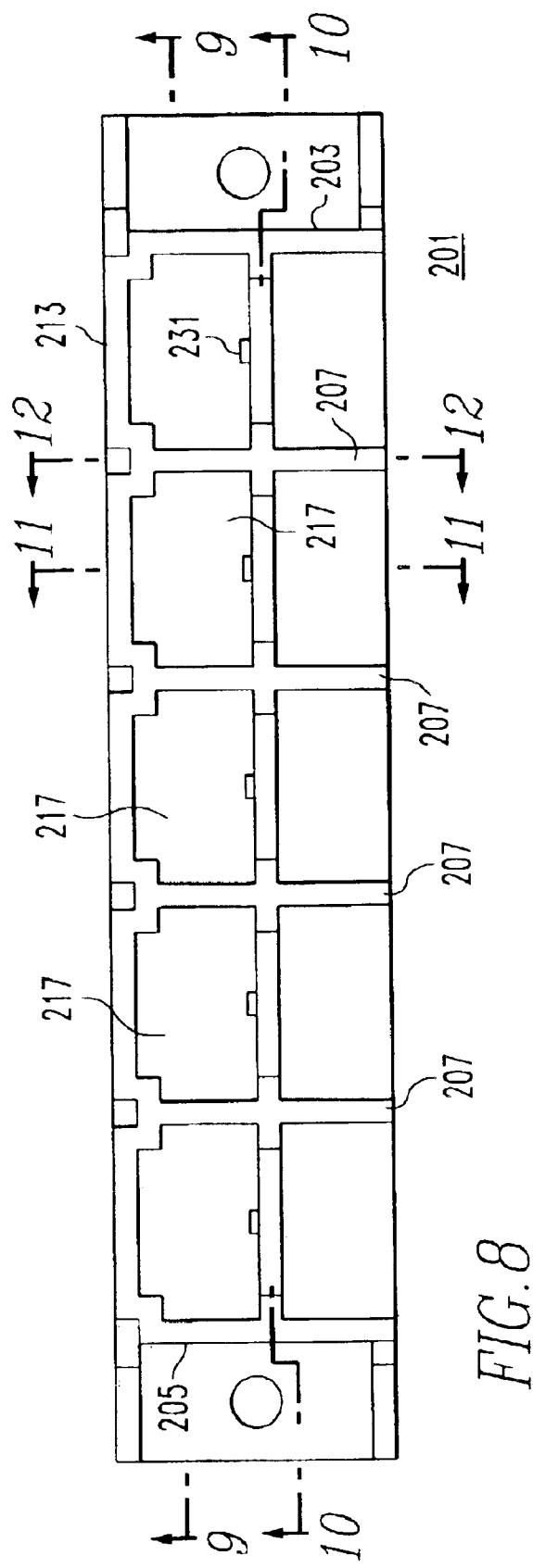
FIG. 8 is a plan view of the housing of the terminal block of FIG. 1.
Figure 9:
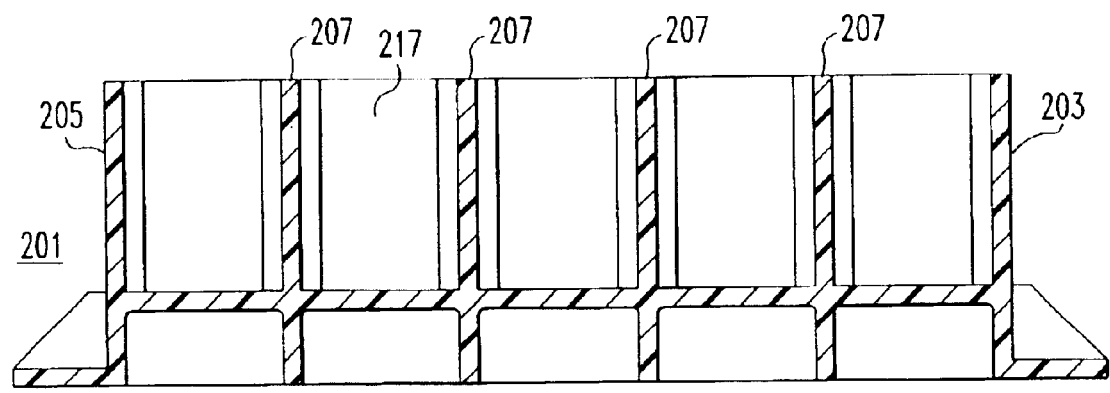
FIG. 9 is a sectional view along lines 9—9 of FIG. 8.
Figure 10:
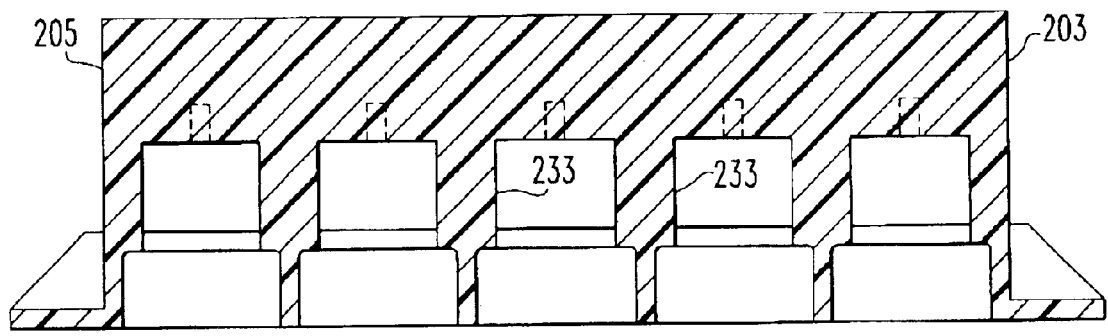
FIG. 10 is a sectional view along lines 10—10 of FIG. 8.

As shown in FIGS. 6, 11 and 14, the internal wall 215 of the housing 201 includes a plurality of openings 233 therein. Each of these openings 233 is associated with the first and second openings 221,223 of a corresponding one of the terminal lugs 219, in order to allow access thereto for insertion of the wiring, such as 33g,31g of FIG. 1 therein.

Although the exemplary housing 201 includes five compartments 217, with five of the terminals lugs 219 providing five of the first terminations 93 and five of the second terminations 94, the invention is applicable to housings and terminal blocks having a wide range of counts of compartments and terminals lugs.

As shown in FIGS. 1 and 13, the housing 201 includes a first end 235 and a second end 237, with each of these ends 235,237 including a respective opening 239,241, which receives a fastener 243 to the auxiliary enclosure 53.

As shown in FIG. 1, the renovation terminal blocks 51 include the access side 229 and a plurality of first terminations 93 electrically connected to at least some of the incoming lines 33 and the branch conductors 43,45,47. The terminal blocks 51 also include a plurality of second terminations 94. Each pair of one of the first terminations 93 and the corresponding one of the second terminations 94 is advantageously disposed for access from the same side 229 of the terminal block 51 and such pair is electrically isolated from at least one adjacent pair of another one of the first terminations 93 and the corresponding one of the second terminations 94. A plurality of cables 31 are then electrically connected between the second terminations 94 and the branch circuit assembly 21.

As shown in FIG. 1, the incoming lines 33 and the branch conductors 43,45,47 include a first portion 245, which enters the auxiliary enclosure 53 from the top wall 63 thereof, and a second portion 247, which is preferably routed at about a right angle with respect to the first portion 245 to one of the first terminations 93 of the common side 229 of the renovation terminal blocks 51.

The cables 31 include a first portion 249, which exits from one of the second terminations 94 of the common side 229 of the renovation terminal block 51, and which are preferably routed in parallel with the second portion 247 of a corresponding one of the incoming lines 33 and the branch conductors 43,45,47. The cables 31 further include a second portion 251, which is electrically connected to the branch circuit assembly 21 or to the terminal strips 35,37.

The renovation terminal block 51 has a longitudinal axis 253, and the branch circuit assembly 21 has a longitudinal axis 255. The renovation terminal block 51 is mounted adjacent the branch circuit assembly 21 with the longitudinal axis 253 of the renovation terminal block 51 being parallel to the longitudinal axis 255 of the branch circuit assembly 21.

The first terminations 93 of the terminal block 51 are adapted to receive a plurality of first conductors 33,43,45,47, and the second terminations 94 are adapted to receive a plurality of second conductors 31.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A renovation load center for a distribution system having incoming lines and a plurality of branch conductors, said renovation load center comprising:
    an enclosure;
    a branch circuit assembly mounted in said enclosure;
    at least one renovation terminal block including a side and a plurality of first terminations electrically connected to at least some of said incoming lines and said branch conductors, said renovation terminal block also including a plurality of second terminations, each of said first terminations being electrically connected to a corresponding one of said second terminations, each pair of one of said first terminations and the corresponding one of said second terminations being disposed on the same side of said renovation terminal block and being electrically isolated from at least one adjacent pair of another one of said first terminations and a corresponding one of said second terminations; and
    a plurality of cables electrically connected between said second terminations and said branch circuit assembly.

2. The renovation load center of claim 1 wherein said at least one renovation terminal block is a first renovation terminal block and a second renovation terminal block.

3. The renovation load center of claim 1 wherein said enclosure includes a main enclosure in which said branch circuit assembly is mounted and an auxiliary enclosure in which said at least one renovation terminal block is mounted, said cables extending from said at least one renovation terminal block in said auxiliary enclosure to said branch circuit assembly in said main enclosure.

4. The renovation load center of claim 3 wherein said auxiliary enclosure is mounted on said main enclosure.

5. The renovation load center of claim 3 wherein said at least one renovation terminal block is a first renovation terminal block and a second renovation terminal block.

6. The renovation load center of claim 5 wherein said auxiliary enclosure includes a first side and an opposite second side; and wherein said first renovation terminal block is mounted on said first side and said second renovation terminal block is mounted on said second side.

7. The renovation load center of claim 1 wherein said enclosure includes a top and a side; wherein said renovation terminal block is mounted proximate the side of said enclosure; wherein said incoming lines and said branch conductors include a first portion, which enters said enclosure from the top thereof, and a second portion, which is routed at about a right angle with respect to said first portion to one of the first terminations of the side of said renovation terminal block; wherein said cables include a first portion, which exits from one of the second terminations of the side of said renovation terminal block, and which are routed in parallel with the second portion of a corresponding one of said incoming lines and said branch conductors, said cables further include a second portion, which is electrically connected to said branch circuit assembly.

8. The renovation load center of claim 1 wherein said renovation terminal block further includes a housing having a first end and a second end, with each of said first and second ends including an opening receiving a fastener to said enclosure.

9. The renovation load center of claim 1 wherein said renovation terminal block further includes a housing having a pair of end walls and a plurality of dividing walls, with each of said dividing walls being between (i) a pair of one of said first terminations and the corresponding one of said second terminations and (ii) an adjacent pair of another one of said first terminations and a corresponding one of said second terminations.

10. The renovation load center of claim 9 wherein said housing further has a back wall between said end walls and normal to said dividing walls and an internal wall parallel to said back wall; wherein said back wall, said end walls, said dividing walls and said internal wall define a plurality of compartments, with each of said compartments housing a corresponding pair of one of said first terminations and the corresponding one of said second terminations; and wherein each pair of one of said first terminations and the corresponding one of said second terminations includes a terminal lug having a first opening adapted to receive one of said incoming lines and said branch conductors, a second opening adapted to receive one of said cables, a first fastener adapted to electrically and mechanically secure said one of said incoming lines and said branch conductors in the first opening, and a second fastener adapted to electrically and mechanically secure the one of said cables in the second opening.

11. The renovation load center of claim 1 wherein said at least one renovation terminal block has a longitudinal axis; wherein said branch circuit assembly has a longitudinal axis; and wherein said at least one renovation terminal block is mounted adjacent said branch circuit assembly with the longitudinal axis of said at least one renovation terminal block being parallel to the longitudinal axis of said branch circuit assembly.

12. A terminal block comprising:
a housing including a side having a plurality of first terminations and a plurality of second terminations, each of said first terminations being electrically connected to a corresponding one of said second terminations, each pair of one of said first terminations and the corresponding one of said second terminations being disposed on the same side of said terminal block and being electrically isolated from at least one adjacent pair of another one of said first terminations and a corresponding one of said second terminations.

13. The terminal block of claim 12 wherein said terminal block is adapted for use in a renovation load center.

14. The terminal block of claim 12 wherein said housing includes a pair of end walls and a plurality of dividing walls, with each of said dividing walls being between (i) a pair of one of said first terminations and the corresponding one of said second terminations and (ii) an adjacent pair of another one of said first terminations and a corresponding one of said second terminations.

15. The terminal block of claim 14 wherein said housing further includes a back wall between said end walls and normal to said dividing walls and an internal wall parallel to said back wall; and wherein said back wall, said end walls, said dividing walls and said internal wall define a plurality of compartments, with each of said compartments housing a corresponding pair of one of said first terminations and the corresponding one of said second terminations.

16. The terminal block of claim 15 wherein each pair of one of said first terminations and the corresponding one of said second terminations includes a terminal lug having a first opening adapted to receive a first conductor, a second opening adapted to receive a second conductor, a first fastener adapted to electrically and mechanically secure the first conductor in the first opening, and a second fastener adapted to electrically and mechanically secure the second conductor in the second opening.

17. The terminal block of claim 16 wherein said terminal lug is a two-position neutral bar.

18. The terminal block of claim 16 wherein each of said compartments includes a lock tab, which engages and retains said terminal lug therein.

19. The terminal block of claim 16 wherein said first and second fasteners are compression screw terminals.

20. The terminal block of claim 16 wherein said internal wall includes a plurality of openings therein; and wherein each of the openings of said internal wall is associated with the first and second openings of a corresponding one of said terminal lugs.

21. The terminal block of claim 12 wherein said first terminations are adapted to receive a plurality of first conductors; and wherein said second terminations are adapted to receive a plurality of second conductors.

22. The terminal block of claim 12 wherein said housing further includes a first end and a second end, with each of said first and second ends including an opening adapted to receive a fastener.

23. The terminal block of claim 12 wherein said housing includes five of said first terminations and five of said second terminations.

* * * * *